Figure 1:
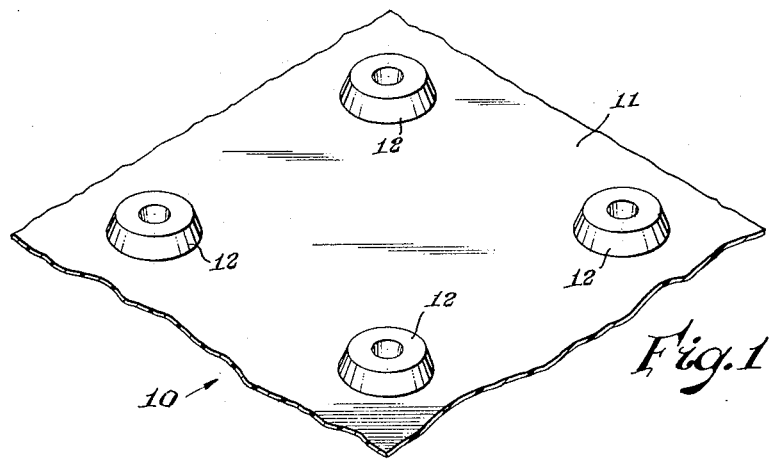

Dec. 15, 1959   G. A. HITTRICH   2,917,292
ASSEMBLIES OF EXTENDED SURFACE ELEMENTS FOR
GAS-LIQUID CONTACT APPARATUS
Filed March 29, 1957   3 Sheets-Sheet 1

INVENTOR.
Gabriel A. Hittrich
BY
Griswold & Burdick
ATTORNEYS

United States Patent Office 2,917,292
Patented Dec. 15, 1959

2,917,292

ASSEMBLIES OF EXTENDED SURFACE ELEMENTS FOR GAS-LIQUID CONTACT APPARATUS

Gabriel A. Hittrich, Midland, Mich., assignor to The Dow Chemical Company, Midland, Mich., a corporation of Delaware Application March 29, 1957, Serial No. 649,342

11 Claims. (Cl. 261—7)

This invention relates to novel and peculiar shaped or fabricated articles that are especially well suited to be employed as extended surface elements and to assemblies thereof that provide extremely large surface area to volume ratios. It also relates to such elements or, more particularly, assemblies of such elements, that are in combination in various fluid distributing apparatus including, for example, water or other fluid cooling or heat-exchanging towers and the like gas-liquid contacting apparatus and settling boxes and other devices for separating solids from suspension in a liquid medium by means of gravitational influences.

In fluid distributing systems, especially the particular types mentioned, it is the conventional practice to utilize wooden slats, boards and the like flat pieces as the individual component portions for extended surface elements. These are not without drawbacks and serious disadvantage. For example, even when the best varieties and grades of wood that are available are employed, they are found to be quite susceptible to becoming rotted when they are subjected to long and continuous water exposure. Soaking in water may thus considerably lessen their strength. Besides, exposure to chemically active media, such as acid media, oftentimes destroys wood structures. These and other factors may necessitate their frequent and costly replacement. In addition, assemblies of wooden, extended surface elements do not have exceptionally high surface area to volume ratios. In order to obtain the necessary rigidity in wooden structures and to facilitate their assembly and installation, it is, as a general practical requirement, necessary to employ wood in thicknesses of at least about one-quarter inch. For many applications, as in settling tanks, thicknesses of at least one-half inch may be more appropriate.

It would be a great advantage to provide extended surface elements that could be easily manufactured, handled and assembled into units having unusually large surface area to volume ratios. It would be even more advantageous if such elements could be fabricated from materials of construction having inherent physical and chemical stability that are capable of successfully withstanding prolonged exposure to various aqueous and corrosive media without deleterious consequence. These advantages could be still further amplified if the elements could be readily provided in a form having specialized surface characteristics so as to adapt them in the best possible manner for the more efficient accomplishment of their intended function in particular applications. Namely, it would be a benefit of tremendous proportion if an extended surface element having the various mentioned desiderations could also be provided with diverse surface characteristics as regards their attraction for aqueous fluids. Thus, assemblies having only their aqueous fluid-contacting surfaces hydrophilic and the remainder of their surfaces hydrophobic would be of extreme utility for application in many varieties of fluid distributing apparatus. In other types of apparatus it would be beneficial to adapt the surfaces so as to minimize possible hold-up of aqueous liquids therein.

These advantages and many other benefits may be realized with extended surface elements in accordance with the present invention which essentially are comprised of thin plane sheets, each of which has disposed therein a sufficient plurality of at least three projections (or bidirectional legs traversing the sheet) to support the sheet thereon that extend primarily to a uniform distance from the major plane of the sheet, each of said primary projections having an oppositely directed counter-projection near its center extending in the opposite direction to said primary projection through and past the major plane of said sheet to a distance from the face of said sheet opposite to that from which said primary projection extends which is about equal to the extended distance of said primary projections.

Advantageously the primary projections are symmetrically disposed in said sheet at spaced intervals suitable to provide rigid and firm support of said sheet when it is rested upon said projections and/or the counter-projections integral therewith. Such spacing, of course, depends to a great extent upon the particular material of construction that is employed for the sheets as well as their manner of assembly and the application in which they are placed. It is, however, a matter that is solvable by use of ordinary skill in the face of given situations. It is also advantageous for the primary projections to extend from the same side or face of the major plane of the sheet and for them to have cup-like configurations with the counter-projections being coaxial therewith in oppositely directed involute form. It is deemed best for both projections to have a right frusto-conical shape with flat or plane outer bearing surfaces for supporting the sheets that are parallel to the major plane of the sheets. The height of the projections may vary with the particular application intended, bearing in mind that the sheets are stacked or otherwise placed or held flatly one on top or next to the other in assembly (or, if desired, with alternate, completely flat blank spacers between the sheets) and that the surface area to volume ratio of the assembly is a direct function of the height of the projections.

The sheets can be made of any suitable material adapted to be formed into strong, relatively rigid structures of little thickness. In this connection, a sheet thickness on the order of 10 to 60 mils, preferably about 40 mils, is most advantageous for most applications of interest. Consequently, the material of construction that is selected should be capable of satisfactorily providing such sheet structures. It should also be capable of being deformed or worked or molded without damage to the desired integral duplex projection form. It is of extreme significance that no additional material is needed besides that which is present in the blank sheet in order to form the projections. Preferably, as is obvious, a corrosion resisting and chemically stable material, particularly to water and acid media (or whatever media may be involved) is employed. Many metals are adapted to meet such requirements. In many cases, however, it is advantageous to form or fabricate the sheets from a plastic material of construction such as a styrene polymer (including polystyrene and various copolymers of styrene with other monomers) or the like or equivalent plastic. In many cases, the surfaces of plastics, most of which are normally hydrophobic, can be chemically or physically treated to render them hydrophilic. In this way, one surface of a plastic sheet can be made hydrophilic while the other is unaltered to remain hydrophobic so as to accomplish the mentioned desiderations for application of the surface elements of the invention in various fluid contacting apparatus. Or, for other purposes, all of the surfaces of the sheet can be made hydrophilic. Thus, the surface of many styrene polymers, including polystyrene, and other plastic materials can be rendered hydrophilic in an easy manner by sandblasting or other surface-roughening physical abrasion or by chemical treatment, as with sulfuric acid or other reagents in a known manner, to provide hydrophilic chemical substituents on all or any desired portion of the plastic surface.

Figure 2:
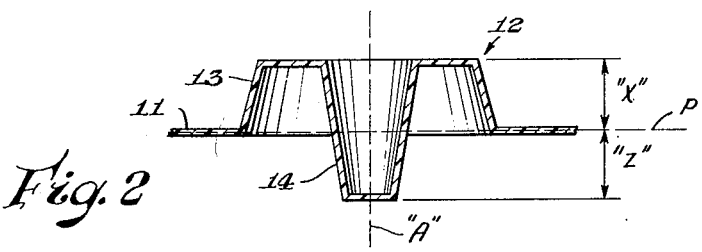
Figure 3:
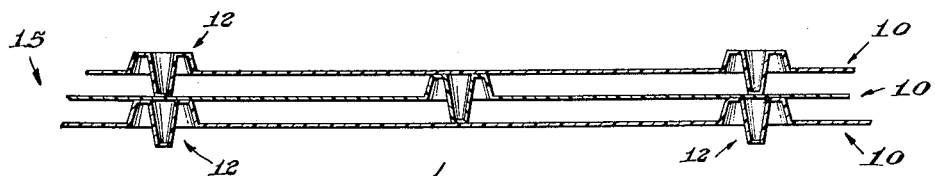
Figure 4:
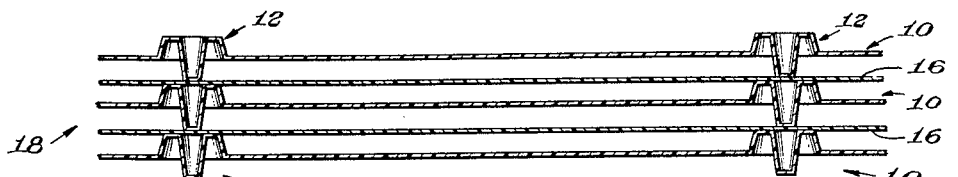
Figure 5:
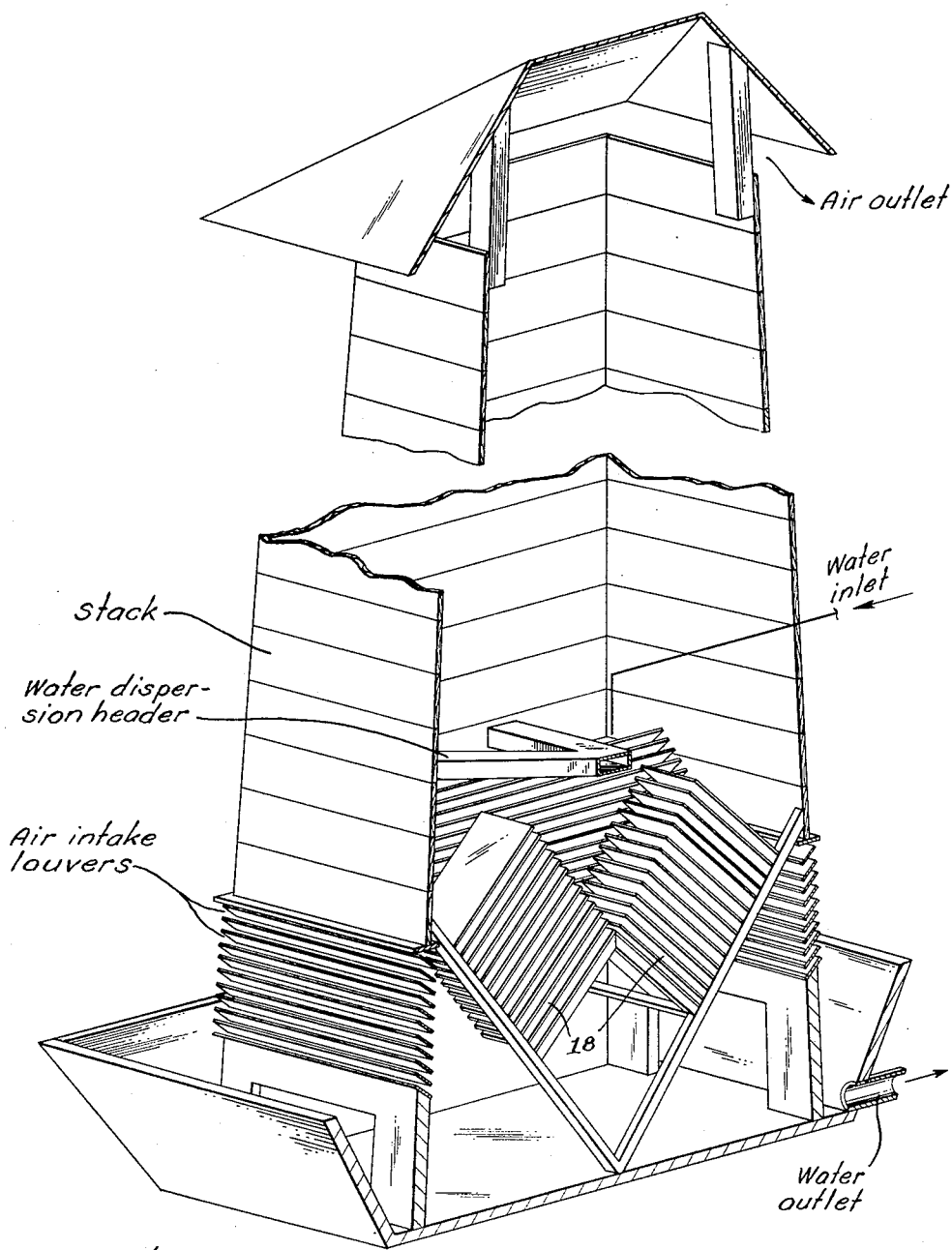
Figure 6:
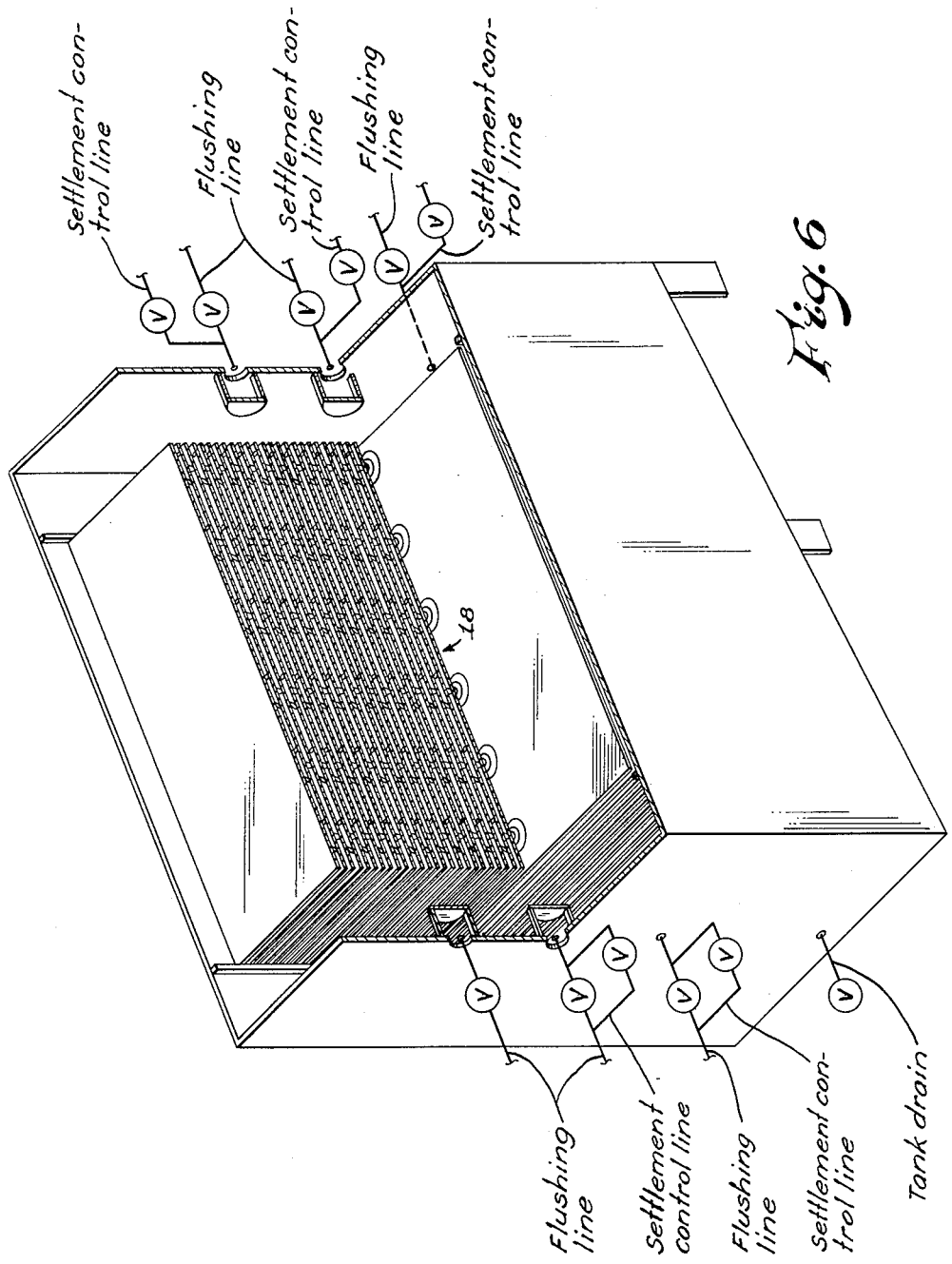

Additional features and advantages of the present invention will be manifest in the following description and specification, taken in connection with the accompanying drawing wherein, insofar as is possible, like reference numerals refer to like or equivalent parts, wherein, Figure 1 is a schematic fragmentary representation of one embodiment of an extended surface element in accordance with the present invention;

Figure 2, in cross-section, illustrates a form of integral duplex projection suitable for formation in the elements;

Figures 3 and 4 schematically illustrate assemblies with the extended surface elements of the invention; and Figures 5 and 6, perspective views that are cut away in cross-section, schematically represent a cooling tower and a settling tank, respectively, using the elements of the invention in assembly as advantageous replacements for the conventional types of dispersion and settling plates used in such installations.

The extended surface element, indicated generally by the reference numeral 10, is shown in Figure 1. It is comprised of a thin, flat sheet 11, suitably of plastic material, having a plurality of dimple-like integral duplex projections 12 that extend in both directions from the major plane of the sheet. A preferred form of projection 12 is shown in Figure 2, being of the coaxial, cuplike, right frusto-conical variety. The major plane of the sheet 11 is depicted by the dotted line "P." The height of the primary projection 13 extending from one face of the sheet is illustrated by the distance marked "X." The height of the involute, counter-projection 14, coaxial along the dotted "A" with the primary projection 13, is the distance "Z" from the opposite face of the sheet 11. As is apparent, the distances "X" and "Z" are equal from the major plane "P." As has been mentioned the projections 12 need not all have the same orientation in the sheet with respect to the directions of the primary and counter projections. It is generally advantageous, however, for such a condition to exist since, for example, it permits easy nesting for storage of unassembled sheets. Likewise the projections need not be cuplike or conical but can be square, pyramidal or have any other desired and suitable specific configuration. In this connection, the thickness of a nested plurality of sheets deformed so as to be nestable according to the present invention is invariably found to only slightly exceed the stacked thickness of a like plurality of the same sheets in blank form.

Figure 3 shows one form of assembly with a plurality of the dimpled or indented sheets 10. In this form the sheets are stacked directly one upon the other with care being taken to keep the projections 12 out of alignment on adjacent sheets. The assembly 18 in Figure 4 is a preferred form wherein blank, perfectly flat spacer sheets 16 are alternately inserted between the dimpled or support sheets 10 with the projections 12 in alignment with one another. The latter form of arrangement generally provides the strongest and most rigid type of essembly capable of withstanding the greatest compressive or superimposed load. In either manner of assembly the stacking of the sheets is continued until a desired overall height is attained. Of course, they may be held or buckled together in assembly by straps, frames or any other desired means for this purpose if and when required. The length and width dimensions of any assembly can be arrived at through use of sheets prefabricated to size or by the cutting and trimming or joining of given size sheets. It is a relatively easy matter, incidentally, to actually construct suitable assemblies in accordance with the invention in the field at a desired site for use.

Figure 5 schematically illustrates a water cooling tower in which the assemblies 18, of suitable dimension, are employed as dispersion plates which may be placed at angles of from 25° to 50° or so from the horizontal. In such an installation it is particularly advantageous to use about 40 mil thick styrene polymer plates having only their top surfaces (over which the water travels) rendered hydrophilic by sand blasting or chemical modification. The bottom or air sides of the sheets need not be altered from their normally hydrophobic state. In the drawing there is shown, besides the supported assembly, the necessary means for supplying liquid as thin moving layers over the upper surfaces of the sheets 10, including the spacer sheets 10 in the assembly 18; means for supplying gas to the spaces between the members of the assembly; and separate means for withdrawing the so-treated fluids from the system. Water cooling towers equipped in this manner are extremely efficient and may be made to have exceptional capacities for given installations by use of assemblies with very large surface area to volume ratios.

In the low velocity solids settlement installation illustrated in Figure 6, the assembly 18, similar to that described in connection with Figure 5, may advantageously be employed to replace the wood settling plates that are conventionally used with the exception that both surfaces of each sheet are rendered hydrophilic. This permits their complete wettability so that water does not cling as voluminous droplets to the underside of the plates at the time of drainage of the installation but remains only as a thin film. It also facilitates actual settling of the solids from suspension. The larger surface area to volume ratio of the assembly 18 minimizes the distance that the suspension must travel before settling and, again, provides for a more efficient and higher capacity apparatus. Figure 6 also shows the necessary means in the settling apparatus for supplying the liquid-solid dispersion to the low velocity settler wherein the dispersion is distributed over the sheets in the assembly, and the separate means for withdrawing clarified liqiud and settled solids therefrom.

What is claimed is:

1. An assembly having a high surface area to volume ratio for fluid distributing apparatus comprised of a plurality of extended surface elements stacked flatly together in a parallel manner to one another, each of said elements comprising a thin, plane sheet having an average thickness between about 10 and about 60 mils and having disposed therein a plurality of integral, cup-like duplex depressions sufficient in number to support the sheet thereon, each of said projections extending primarily to a uniform distance from the major plane of the sheet, each of said cup-like primary projections having an oppositely directed, coaxial, involute counter-projection extending in the opposite direction to said primary projection in assoication therewith through and past the major plane of said sheet to a distance from the face of said sheet opposite from which said associated primary projection extends which distance is about equal to the extended distance of said primary projections, each of said cup-like primary projections and involute counter-projections integral therewith having substantially right frusto-conical configurations and plane outer bearing surfaces disposed parallel to said sheet.

2. The assembly of claim 1, wherein the thickness of the elements is about 40 mils and they are comprised of a styrene polymer.

3. The assembly of claim 2 in combination with an apparatus for gas-liquid contact, including means for supplying liquid as a thin moving layer over one of the surfaces of each of said sheets facing the same side of said assembly; means for supplying gases to the spaces between the members of the assembly and separate means for withdrawing the so treated fluids from the apparatus.

4. The assembly of claim 2 in combination with an apparatus for settling solids from liquid suspension that is being moved at a relatively low velocity, including means for supplying a liquid-solid dispersion thereto and separate means for withdrawing clarified liquids and settled solids therefrom, wherein all the surfaces on both sides of the assembly are hydrophilic.

5. The assembly of claim 1, wherein each of the projections in each of said elements are spaced symmetrically in said sheet and extend primarily in the same direction therefrom.

6. The assembly of claim 1, wherein the cup-like depressions in each of said sheets are symmetrically disposed therein.

7. The assembly of claim 1, wherein the cup-like depressions in each of said sheets are symmetrically disposed in identical symmetrical disposition as regards placement in each of the sheets therein.

8. The assembly of claim 1, and including, in addition thereto and in combination therewith, flat, spacer, blank sheets between each of said alternate elements.

9. The assembly of claim 1, wherein said depressions are integral and free from perforations therein.

10. The assembly of claim 1, wherein all of the surfaces on one of the same respective sides on each of said elements in the assembly are hydrophilic and those on each of the opposite sides are hydrophobic.

11. The assembly of claim 1, wherein each of said elements are composed of a plastic material of construction.

References Cited in the file of this patent

UNITED STATES PATENTS

| | | |
|---|---|---|
| 1,502,873 | Oberg | July 29, 1924 |
| 2,119,013 | Kerns | May 31, 1938 |
| 2,595,838 | Fuglie | May 6, 1952 |
| 2,596,642 | Boestad | May 13, 1952 |
| 2,689,988 | French | Sept. 28, 1954 |
| 2,759,719 | Odenthal | Aug. 21, 1956 |
| 2,783,982 | Kahl | Mar. 5, 1957 |
| 2,793,017 | Lake | May 21, 1957 |

FOREIGN PATENTS

| | | |
|---|---|---|
| 60,262 | Norway | Jan. 9, 1939 |
| 1,024,889 | France | of 1953 |